(12) United States Patent
Unrath (10) Patent No.: US 9,486,877 B2
(45) Date of Patent: Nov. 8, 2016

(54) LASER PULSE ENERGY CONTROL SYSTEMS AND METHODS

(71) Applicant: ELECTRO SCIENTIFIC INDUSTRIES, INC., Portland, OR (US)

(72) Inventor: Mark A. Unrath, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 296 days.

(21) Appl. No.: 14/151,420

(22) Filed: Jan. 9, 2014

(65) Prior Publication Data

US 2014/0197140 A1 Jul. 17, 2014

Related U.S. Application Data

(60) Provisional application No. 61/751,810, filed on Jan. 11, 2013.

(51) Int. Cl.
*B23K 26/04* (2014.01)
*B23K 26/06* (2014.01)

(52) U.S. Cl.
CPC ......... *B23K 26/0626* (2013.01); *B23K 26/082* (2015.10)

(58) Field of Classification Search
CPC ............. B23K 26/00; B23K 26/062–26/0626; B23K 26/08–26/082
USPC ......................................... 219/121.6–121.86
See application file for complete search history.

(56) References Cited

U.S. PATENT DOCUMENTS

| 3,764,937 | A | 10/1973 | Skolnick et al. | |
|---|---|---|---|---|
| 5,593,606 | A | 1/1997 | Owen et al. | |
| 5,841,099 | A * | 11/1998 | Owen | C23C 14/046 219/121.69 |
| 6,370,174 | B1 | 4/2002 | Onkels et al. | |
| 6,433,301 | B1 | 8/2002 | Dunsky et al. | |
| 6,676,878 | B2 * | 1/2004 | O'Brien | B23K 26/032 219/121.62 |
| 6,706,999 | B1 | 3/2004 | Barrett et al. | |
| 7,027,199 | B2 | 4/2006 | Johnson | |

(Continued)

FOREIGN PATENT DOCUMENTS

| JP | 2003136270 A | 5/2003 |
|---|---|---|
| JP | P2008-49383 A | 3/2008 |
| WO | WO2009/087392 A1 | 7/2009 |

OTHER PUBLICATIONS

Notification of Transmittal of the International Search Report and the Written Opinion of the International Search Authority, or the Declaration dated Apr. 17, 2014, for application PCT/US2014/010902, filed Jan. 9, 2014.

(Continued)

*Primary Examiner* — Sang Y Paik (57) ABSTRACT

Systems and methods provide laser pulse energy control and/or monitoring. An example laser processing apparatus includes a laser system to generate a beam of laser pulses and a pulse energy control system to adjust the pulse energy of each laser pulse in the beam on a pulse-by-pulse basis. The pulse energy control system includes an open loop feedforward control path that selects a pulse energy transmission value for each laser pulse based on a calibrated transmission curve that maps laser pulse energy as a function of pulse repetition frequency. A laser energy monitor measures the laser pulse energy of each laser pulse in the beam of laser pulses. A power control loop may further adjust the pulse energy of one or more laser pulses in the beam of laser pulses based on feedback from the laser energy monitor.

20 Claims, 7 Drawing Sheets

(56) References Cited

U.S. PATENT DOCUMENTS

| | | | |
|---|---|---|---|
| 7,133,186 B2 | 11/2006 | Johnson | |
| 7,244,906 B2 * | 7/2007 | Jordens | B23K 26/03 219/121.62 |
| 7,259,354 B2 | 8/2007 | Pailthorp et al. | |
| 7,425,471 B2 | 9/2008 | Bruland et al. | |
| 8,026,158 B2 | 9/2011 | Bruland et al. | |
| 8,288,679 B2 | 10/2012 | Unrath et al. | |
| 8,404,998 B2 | 3/2013 | Unrath et al. | |
| 8,680,430 B2 | 3/2014 | Unrath | |
| 2005/0128553 A1 * | 6/2005 | Toyama | B23K 26/08 359/198.1 |
| 2006/0249490 A1 | 11/2006 | Renaud | |
| 2007/0075063 A1 | 4/2007 | Wilbanks et al. | |
| 2010/0252959 A1 | 10/2010 | Lei et al. | |
| 2010/0301023 A1 * | 12/2010 | Unrath | B23K 26/0648 219/121.67 |
| 2012/0273472 A1 | 11/2012 | Unrath et al. | |

OTHER PUBLICATIONS

European Search Report Issued Jul. 21, 2016 concerning European Patent Application No. EP14737541, which corresponds with the subject U.S. Appl. No. 14/151,420. 7 pages.

* cited by examiner

LASER PULSE ENERGY CONTROL SYSTEMS AND METHODS

RELATED APPLICATION

This application claims the benefit under 35 U.S.C. §119 (e) of U.S. Provisional Application No. 61/751,810, filed Jan. 11, 2013, which is hereby incorporated by reference herein in its entirety.

TECHNICAL FIELD

This disclosure relates generally to laser processing apparatuses and to methods of processing workpieces using the same.

BACKGROUND INFORMATION

Laser-processing of features (e.g., through-vias, blind vias, trenches, routs, kerfs, and other features) within one or more materials of a workpiece can be sensitive to laser power. In many applications (e.g., in which features are laser-processed by delivering laser pulses onto the workpiece), the speed or efficiency with which a feature is formed, and the quality of the feature ultimately formed, can be very sensitive to the pulse energy of the individual pulses delivered to the workpiece. For example, when laser-processing a workpiece such as a printed circuit board, a flexible printed circuit, or the like, a relatively high pulse energy may be desirable when laser processing (e.g., ablating) an electrically conductive material such as copper, while a relatively lower pulse energy may be desirable when laser processing (e.g., ablating) a dielectric material without inducing heat effects (e.g., due to charring and/or melting) within the dielectric material and without damaging adjacent materials (e.g., copper).

Conventional methods of controlling or adjusting laser power or pulse energy include attenuation optics (e.g., polarization optics or acousto-optic modulators), or direct control of laser optical output power by varying the pump power to the lasing medium. These conventional approaches have disadvantages including slow speed (e.g., for mechanically-adjusted polarization optics), variation in laser delivery (e.g., in the control of lasing medium pumping or Q-switch timing), or a lack of coordination with other operations of the laser processing apparatus.

SUMMARY OF THE DISCLOSURE

Embodiments of the present disclosure, as examples described herein, address the limitations discussed above and other limitations associated with conventional methods of controlling or adjusting laser power or pulse energy.

In certain embodiments, systems and methods provide laser pulse energy control and/or monitoring. An example laser processing apparatus includes a laser system to generate a beam of laser pulses and a pulse energy control system to adjust the pulse energy of each laser pulse in the beam on a pulse-by-pulse basis. The pulse energy control system includes an open loop feedforward control path that selects a pulse energy transmission value for each laser pulse based on a calibrated transmission curve that maps laser pulse energy as a function of laser pulse repetition frequency. A laser energy monitor measures the laser pulse energy of each laser pulse in the beam of laser pulses. A power control loop may further adjust the pulse energy of one or more laser pulses in the beam of laser pulses based on feedback from the laser energy monitor.

Additional aspects and advantages will be apparent from the following detailed description of preferred embodiments, which proceeds with reference to the accompanying drawings.

DETAILED DESCRIPTION OF PREFERRED EMBODIMENTS

Example embodiments are described below with reference to the accompanying drawings. Many different forms and embodiments are possible without deviating from the spirit and teachings of the invention and so the disclosure should not be construed as limited to the example embodiments set forth herein. Rather, these example embodiments are provided so that this disclosure will be thorough and complete, and will convey the scope of the invention to those skilled in the art. In the drawings, the sizes and relative sizes of components may be exaggerated for clarity. The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween.

As used herein, "power control" is a generic term used to describe control of the laser output power. Example embodiments described herein, however, measure and control the pulse energy (PE) of a laser pulse. For a given pulse repetition frequency (PRF), the laser power pulse power is equal to PE×PRF. For a given PRF, PE control is equivalent to power control, and the two terms are sometimes used interchangeably. In addition, "PRF" may be specified by its inverse, the pulse period (PP) or the inter-pulse period (IPP). Typically, machine users refer to PRF, but the power control implementation specifies pulse period. The two terms are therefore interchangeably used in this discussion where appropriate.

Figure 1:
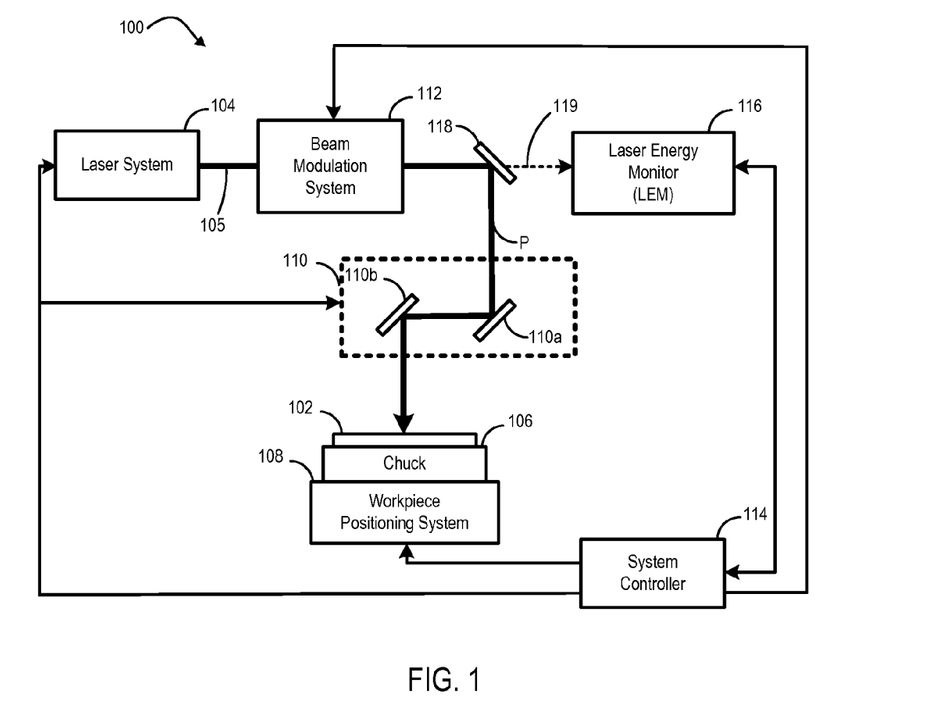
FIG. 1 schematically illustrates a laser processing apparatus according to one embodiment of the present disclosure.

Referring to FIG. 1, a laser processing apparatus, such as laser processing apparatus 100, is configured to form features (e.g., through-vias, blind vias, trenches, routs, kerfs, and other features) within one or more materials of a workpiece 102 by directing a beam 105 of laser pulses along a path P to impinge upon the workpiece 102. Features may be formed by controlling the laser processing apparatus 100 to perform one or more tooling actions (e.g., a percussion drilling action, a trepan drilling action, a skiving action, a routing action, a cutting action, and other actions), wherein each tooling action may include one or more steps. As illustrated, the laser processing apparatus 100 may include a laser system 104, a chuck 106, a workpiece positioning system 108, a beam positioning system 110, and a beam modulation system 112. Although not illustrated, the laser processing apparatus 100 may further include one or more supplemental systems (e.g., optics, mirrors, beam splitters, beam expanders, and/or beam collimators) configured to shape, expand, focus, reflect, and/or collimate the beam 105 of laser pulses at any point along the path P. In one embodiment, a set of one or more supplemental systems may be referred to as an "optics train."

In one embodiment, and as will be discussed in greater detail herein, the operation of one or more or all of the workpiece positioning system 108, beam positioning system 110, and beam modulation system 112 may be controlled to change the position of where the beam 105 of laser pulses impinges upon the workpiece 102 (i.e., the beam position relative to the workpiece 102). In another embodiment, and as will also be discussed in greater detail herein, the operation of one or more or all of the workpiece positioning system 108, beam positioning system 110, and beam modulation system 112 may be controlled to change the velocity and/or acceleration with which the beam position changes relative to the workpiece 102.

The laser system 104 may be configured to generate the beam 105 of laser pulses. Laser pulses within the beam 105 may, for example, have a wavelength in the infrared, visible, or ultraviolet spectrums. For example, laser pulses within the beam 105 may have a wavelength such as 1064 nm, 532 nm, 355 nm, 266 nm, and the like. Laser pulses within the beam 105 are may generally generated at a PRF in a range from about 20 kHz to about 2000 kHz. It will be appreciated, however, that the PRF may be less than 20 kHz or greater than 2000 kHz.

The chuck 106 may be provided as any chuck capable of suitably or beneficially supporting the workpiece 102. In one embodiment, the chuck 106 can be provided as a vacuum chuck, an electrostatic chuck, a mechanical chuck, or the like or a combination thereof.

Figure 2:
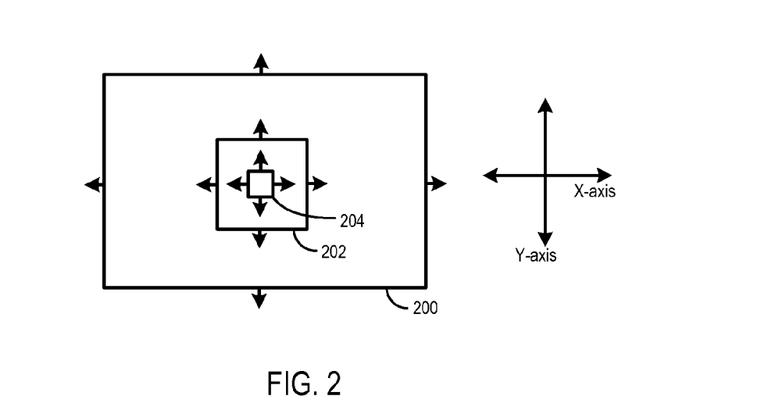
FIG. 2 schematically illustrates scan fields associated with various components or systems of the apparatus shown in FIG. 1.

The workpiece positioning system 108 is configured to translate the chuck 106, which supports the workpiece 102, along one or more directions parallel to an X-axis, Y-axis, and/or Z-axis (where the Z-axis is at least substantially perpendicular to the surface of the chuck 106, and where the X-axis, Y-axis, and Z-axis are mutually orthogonal to each other), to rotate the chuck 106 about one or more of the X-axis, Y-axis, and/or Z-axis, or the like or a combination thereof. In one embodiment, the workpiece positioning system 108 may include one or more stages configured to move the chuck as discussed above. When a workpiece 102 is supported by the chuck 106, the workpiece positioning system 108 can be operated to move or scan the workpiece 102 (e.g., along the X-axis and Y-axis) within a first scan field (e.g., first scan field 200, as shown in FIG. 2) relative to the path P. In one embodiment, the workpiece positioning system 108 can be operated to scan the workpiece 102 in any direction along the X-axis for a distance in a range from about 400 to about 700 mm (e.g., about 635 mm), in any direction along the Y-axis for a distance in a range from about 400 mm to about 700 mm (e.g., about 533 mm), or a combination thereof.

The beam positioning system 110 is configured to deflect, reflect, refract, diffract, or the like, or a combination thereof, the beam 105 of laser pulses to scan the beam position within a second scan field (e.g., second scan field 202, as shown in FIG. 2) relative to the workpiece 102. In one embodiment, the beam positioning system 110 can be operated to scan the beam position in any direction along the X-axis for a distance in a range from about 1 mm to about 50 mm (e.g., about 30 mm), in any direction along the Y-axis for a distance in a range from about 1 mm to about 50 mm (e.g., about 30 mm), or a combination thereof. Generally, operation of the beam positioning system 110 can be controlled to scan the beam position relative to the workpiece 102 at a velocity and/or acceleration that is greater than that by which the workpiece positioning system 108 can scan the workpiece 102 within the first scan field 200. In the illustrated embodiment, the beam positioning system 110 includes a pair of galvanometer (galvo)-based mirrors 110a and 110b, disposed within the path P. Each mirror 110a and 110b is configured to be rotated (e.g., about the X-axis or Y-axis), thereby deflecting the path P and scanning the beam position within the second scan field 202. It will be appreciated, however, that the beam positioning system 110 may be configured in any other suitable or beneficial manner.

The beam modulation system 112 is configured to deflect, reflect, refract, diffract, or the like, or a combination thereof, the beam of laser pulses to scan the beam position within a third scan field (e.g., third scan field 204, as shown in FIG. 2) relative to the workpiece 102. In one embodiment, the beam modulation system 110 can be operated to scan the beam position in any direction along the X-axis for a distance in a range from about 0.05 mm to about 0.2 mm (e.g., about 0.1 mm), in any direction along the Y-axis for a distance in a range from about 0.05 mm to about 0.2 mm (e.g., about 0.1 mm), or a combination thereof. Those persons skilled in the art will recognize that these ranges are provided by way of example and that the beam position may be scanned within smaller or larger ranges. Generally, operation of the beam modulation system 112 can be controlled to scan the beam position relative to the workpiece 102 at a velocity and/or acceleration that is greater than that by which the beam positioning system 110 can scan beam position within the second scan field. In one embodiment, the beam modulation system 112 includes a single acousto-optic deflector (AOD) configured to deflect the beam 105 of laser pulses to scan the beam position within the third scan field 204 along the X-axis and Y-axis. In another embodiment, the beam modulation system 112 includes two AODs, wherein a first AOD is configured to deflect the beam 105 of laser pulses and scan the beam position within the third scan field 204 along the X-axis and a second AOD is configured to deflect the beam 105 of laser pulses and scan the beam position within the third scan field 204 along the Y-axis. It will be appreciated, however, that the beam modulation system 112 may be configured in any other suitable or beneficial manner. For example, the beam modulation system 112 may include one or more acousto-optic modulators (AOMs), electro-optic deflectors (EODs), electro-optic modulators (EOMs), or the like or a combination thereof in addition to, or as a substitute for, an AOD.

The laser processing apparatus 100 may further include a system controller 114 communicatively coupled to the workpiece positioning system 108, the beam positioning system 110, the beam modulation system 112, and the laser system 104. The system controller is configured to control the aforementioned operation of one or more or all of these systems (the workpiece positioning system 108, the beam positioning system 110, the beam modulation system 112, and/or the laser system 104) to form features (e.g., through-vias, blind vias, trenches, routs, kerfs, and other features) within the workpiece 102. In one embodiment, the system controller 114 can control an operation of the laser system 104 to change the PRF (e.g., within a range from about 20 kHz to about 2000 kHz) of pulses generated by the laser system 104.

In one embodiment, the system controller 114 may control an operation of the beam modulation system 112 to scan the beam position relative to the workpiece 102 and form a "high feature-density region" within the workpiece 102 (e.g., a region containing features separated by a pitch of less than or equal to 500 µm, or thereabout). The system controller 114 may further control an operation of the beam positioning system 110 and/or the workpiece positioning system 108 while forming the high feature-density region.

In another embodiment, the system controller 114 may control an operation of the beam positioning system 110 to scan the beam position relative to the workpiece 102 and form a "medium feature-density region" within the workpiece 102 within the workpiece 102 (e.g., a region containing features separated by a pitch greater than 500 µm, or thereabout, such as about 1000 µm). The system controller 114 may further control an operation of the beam modulation system 112 and/or the workpiece positioning system 108 while forming the medium feature-density region.

Figure 3:
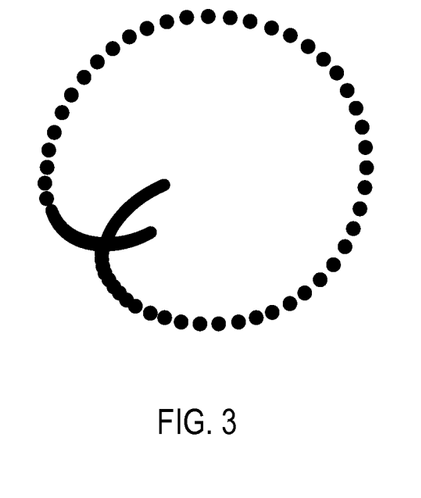
FIG. 3 and FIG. 4 graphically illustrates patterns of spots created by scanning a beam position relative to a workpiece, according to certain embodiments of the present disclosure.

In yet another embodiment, the system controller 114 may control an operation of the beam positioning system 110 and further control an operation of the beam modulation system 112 in a coordinated manner to overcome high-speed velocity limitations, small-area positioning errors, and bandwidth limitations of the beam positioning system 110. For example, if the laser processing apparatus 100 did not include the beam modulation system 112, the beam positioning system 110 could be controlled to scan the beam position relative to the workpiece 102 such that laser pulses within the beam sequentially impinge upon the workpiece 102 to form a rounded pattern of spots as shown in FIG. 3 (as shown, the circle-shaped pattern of spots has a maximum width of about 600 µm). By coordinating operation of the beam modulation system 112 with the beam positioning system 110, however, the laser processing apparatus 100 can be configured to form a square-shaped pattern of spots as shown in FIG. 4 (as shown, the square-shaped pattern of spots has a dimension of about 600 µm×about 600 µm).

Figure 4:
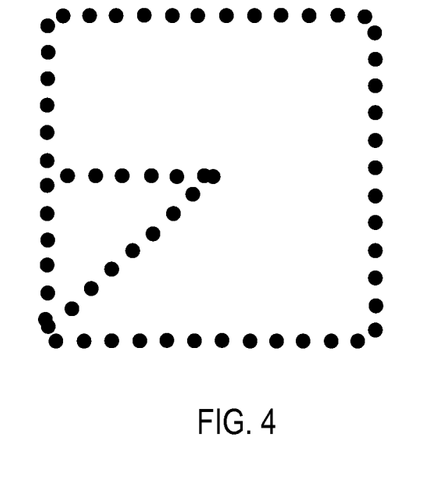
Figure 5:
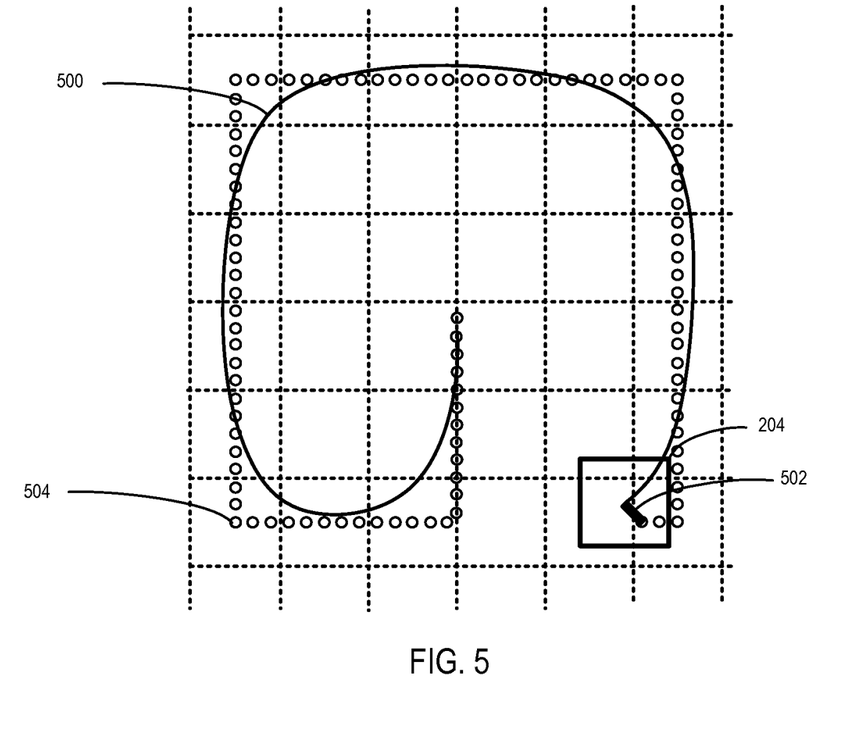
FIG. 5 is a chart schematically illustrating one embodiment of a process of forming the pattern of spots shown in FIG. 4.

In one embodiment, and with reference to FIG. 5, the pattern of spots shown in FIG. 4 can be formed by controlling the beam positioning system 110 to scan the beam position within the second scan field 202 along a line such as line 500, and the beam modulation system 112 can be controlled to further scan the beam position within the third scan field 204 (which is centered at the end of the line 500) along a direction (e.g., indicated by line 502, centered within the third scan field 204) such that laser pulses sequentially impinge upon the workpiece 102 to form a square-shaped pattern of spots 504 (e.g., such as that shown in FIG. 4). By applying the example process as discussed above with respect to FIG. 5, the beam position can be scanned over the workpiece at a rate of about 5 meters per second (m/s). It will be appreciated, however, that operation of the operation of the beam modulation system 112 with the beam positioning system 110 can be coordinated in any manner to form any suitable or beneficial pattern of spots on the workpiece 102.

Generally, the system controller 114 can include operating logic (not shown) that defines various control functions, and may be in the form of dedicated hardware, such as a hardwired state machine, a processor executing programming instructions, and/or a different form as would occur to those skilled in the art. Operating logic may include digital circuitry, analog circuitry, software, or a hybrid combination of any of these types. In one embodiment, the system controller 114 may include a processor such as a programmable microcontroller, microprocessor, or other processor that can include one or more processing units arranged to execute instructions stored in memory in accordance with the operating logic. Memory (e.g., computer-readable medium) can include one or more types including semiconductor, magnetic, and/or optical varieties, and/or may be of a volatile and/or nonvolatile variety. In one embodiment, memory stores instructions that can be executed by the operating logic. Alternatively or additionally, memory may store data that is manipulated by the operating logic. In one arrangement, operating logic and memory are included in a controller/processor form of operating logic that manages and controls operational aspects the workpiece positioning system 108, the beam positioning system 110 and/or the beam modulation system 112, although in other arrangements they may be separate.

As described herein, the laser processing apparatus 100 is configured to enable coordinated operation of the beam positioning system 110 and the beam modulation system 112 to form features at high speed and with high positional accuracy. In other embodiments, and as described below, the laser processing apparatus 100 can further include a laser power control (LPC) system having, for example, the beam modulation system 112 and the system controller 114, as well as other systems such as a laser energy monitor (LEM) 116, and other components, systems and subsystems as will be described in greater detail below. Generally, the LPC system may be configured to measure the pulse energy of individual laser pulses (e.g., for quality and control purposes), control the pulse energy of individual laser pulses, facilitate rapid changes to pulse energy and PRF, coordinate the pulse energy control of individual laser pulses with beam position, coordinate generation and modulation of the laser pulses, or the like or a combination thereof.

A. Pulse Energy Measurement

To measure the pulse energy of individual laser pulses, the laser processing apparatus 100 may further include the aforementioned LEM 116 and a beam splitting element 118 (e.g., a partially transmissive mirror, a diffractive beam splitter, or the like or a combination thereof). The beam splitting element 118 is disposed within the path P between the beam positioning system 110 and the beam modulation system 112, and is oriented or otherwise configured to transmit a portion (e.g., in a range from about 1% to about 2% of the energy) of each pulse within the beam 105 and reflect the remaining portion of each pulse within the beam 105 along the path P toward the workpiece 102. The portion of the beam 105 that is transmitted through the beam splitting element 118 can be referred to as a sampling beam 119.

In one embodiment, the LEM 116 is configured to measure the pulse energy of each laser pulse within the sampling beam 119 by integrating power of each individual laser pulse within the sampling beam 119. To integrate the power of each individual laser pulse, the LEM 116 may include a photodetector (e.g., a photodiode, not shown, configured to be impinged by pulses within the sampling beam 119), as well as one or more high speed amplifiers, an integrator, and an analog-to-digital converter (ADC). The photodiode may be configured to convert an impinging laser pulse into an electrical current. The electrical current may then be amplified and/or filtered by high speed amplifiers. The integrator (e.g., a resettable integrator) then integrates the amplified and/or filtered electrical current to create a signal that is proportional to total pulse energy of the impinged laser pulse. The integrator can be reset (e.g., under control of the system controller 114) just before a laser pulse impinges upon the photodiode to keep the integrator within a valid voltage range.

In certain embodiments, the ADC then reads the output of the integrator twice: a first ADC reading may be performed after the integrator is reset, but before the laser pulse impinges upon the photodiode; and a second ADC reading may then be performed after the laser pulse impinges upon the photodiode. In one embodiment, the delay between the two ADC readings may be fixed (e.g., based on the laser pulse width, the bandwidth of any conditioning amplifiers, or the like or a combination thereof). In another embodiment, the delay between the two ADC readings may be variable to account for changes in pulse width as a function of PRF. For any particular pulse within the sampling beam 119, the difference between the two ADC readings may be scaled according to the photodiode and electrical amplification gain and can be interpreted to represent (e.g., as "PE data") the pulse energy pulse energy (e.g., given in µJ) of the remaining portion of the corresponding laser pulse that will ultimately impinge upon the workpiece 102. In one embodiment, the ADC may read the integrator output a third time (e.g., after the second ADC reading) to estimate the optical or electronic bias input to the integrator. This estimated bias may be subtracted from the measured pulse energy to improve robustness against thermal variations in electrical bias, or the effects of ambient light on the photodetector.

It will be appreciated that the design of the amplifiers preceding the ADC can affect the performance of the LEM 116, and that design tradeoffs can be made between bandwidth (settling time), noise, and gain. In order to convert the pulse energy reading at pulse repetition rates in a range from about 20 kHz to about 200 kHz, the amplifiers preceding the ADC can be designed such that the output of the integrator settles to within the desired pulse energy conversion tolerance within the pulse period time (i.e., within 1/PRF). By measuring pulse energy using the LEM 116 as described above, the pulse energy of each individual laser pulse within the sampling beam 119 can be measured, rather than the average power of a series of laser pulses sequentially impinging upon the photodiode. Measuring the pulse energy of each individual pulse, the pulse energy of individual laser pulses can also be controlled on a pulse-by-pulse basis, and errors in the pulse energy of laser pulses ultimately delivered to the workpiece 102 can be corrected on a pulse-by-pulse basis.

B. Pulse Energy Control

Control of the pulse energy for individual pulses can be implemented using the beam modulation system 112. In an embodiment in which the beam modulation system 112 includes an acousto-optic (AO) device (e.g., an AOD, an AOM), the fraction of the process laser beam power transmitted through the AO device can be controlled by varying the level of radio frequency (RF) power applied to the AO device. The pulse energy of individual laser pulses may be controlled by suitably or beneficially controlling the RF power applied to the AO device on a pulse-by-pulse basis, during the laser-processing process. AO devices such as AODs and AOMs have nonlinear transmission characteristics (vs applied RF power). Accordingly, it may be desirable to map out the nonlinear transmission characteristics of such AO devices to linearize their transmission response. In another embodiment, the beam modulation system 112 includes an electro-optic (EO) device (e.g., an EOD, an EOM). For example, an EOM may be used to vary the fraction of the process laser beam power transmitted to the workpiece 102.

Regardless of the specific device used to control the pulse energy of laser pulses within the beam 105, the device used should be fast enough to operate on a pulse-by-pulse basis, which may require update rates of about 20 kHz to about 2000 kHz. By controlling the pulse energy of individual laser pulses on a pulse-by-pulse basis, the laser system 104 can be "free-run" at a constant PRF and the pulse energy of any laser pulse generated by the laser system 104 can be controlled (e.g., partially attenuated or completely attenuated so as to be "blanked" to zero power) by the beam modulation system 112. Blanking laser pulses can improve the stability of the laser system 104 (e.g., in terms of pointing, power, and/or beam quality), which can be affected by thermal variations within the laser system 104 if operation of the laser system 104 is controlled to start and stop generating the laser pulses.

C. Pulse Energy Calibration

As discussed above, the laser processing apparatus 100 can be configured to change the pulse energy of individual laser pulses generated by the laser system 104 on a pulse-by-pulse basis, and can change the PRF with which the laser pulses are generated. In one embodiment, the laser processing apparatus 100 can be configured to change the pulse energy and/or PRF very rapidly (e.g., within one inter-pulse period, IPP, or within a few inter-pulse periods, wherein an inter-pulse period corresponds to 1/PRF). In another embodiment, the pulse energy and PRF can be changed simultaneously. Calibration of the pulse energy as a function of PRF may be useful when varying PRF and/or pulse energy. For example, a particular tooling action may be performed by delivering laser pulses to the workpiece 102 at a relatively high pulse energy and at a relatively low PRF in one step and then delivering laser pulses to the workpiece 102 at a relatively low pulse energy and at a relatively high PRF in a subsequent step. Relying on feedback control of the pulse energy output may be too slow, since many pulses are required to allow a controller to properly adjust the transmission to achieve the desired pulse energy setpoint. By implementing an open loop feedforward control path (supported by the pulse energy vs PRF mapping), pulse energy changes can be rapidly achieved without relying on the slower feedback control path. This can be accomplished by mapping the relation between pulse energy vs PRF before processing begins. Since the characteristics of the laser can change over time, this mapping may be refreshed periodically—e.g., before processing each workpiece.

D. Coordination of Pulse Energy Control with Beam Position

According to embodiments disclosed herein, pulse energy measurement and pulse energy control may be used to coordinate the pulse energy of a particular laser pulse delivered to a workpiece 102 with the beam position of the particular laser pulse relative to the workpiece 102. In one embodiment, this coordination can be achieved by dividing laser processing commands (e.g., issued from the system controller 114 to one or more of the laser system 104, the workpiece position system 108, the beam positioning system 110, and/or the beam modulation system 112) into a series of separate "process segments" that each include information describing the beam position, pulse energy setpoints for laser pulses, or the like, or a combination thereof. Accordingly, the system controller 114 may include a segment processing subsystem configured to filter, divide, process or otherwise convert information contained in each "process segment" into beam position commands and laser pulse energy commands. The beam position commands can be executed through a beam position control subsystem of the system controller 114, and the laser pulse energy commands may be executed by the laser power control subsystem.

In one embodiment, the segment processing subsystem and the laser power control system may each include a realtime controller. When beam position commands are delivered from the beam position control subsystem of the system controller 114 to one or more of the workpiece positioning system 108, beam positioning system 110 and beam modulation system 112, the operations of one or more of these components can be controlled to control the location of the beam position relative to the workpiece 102. When laser pulse energy commands are delivered from the laser power control system of the system controller 114 to the laser power control system one or more of the laser system 104, the workpiece positioning system 108, beam positioning system 110 and beam modulation system 112, the operations of one or more of these components can be controlled to control the location of the beam position relative to the workpiece 102. Appropriate synchronization time delays are included in certain embodiments to properly synchronize the generation of laser pulses with beam position.

In one embodiment, a synchronization process is used to synchronize delivery of a series of consecutive laser pulses within the beam 105 (i.e., a "laser pulse train") to the workpiece 102 with the beam position relative to the workpiece 102. Laser pulses within a common laser pulse train may have the same pulse energy (at least substantially) and be temporally spaced apart from each other (at least substantially) by the inter-pulse period (also referred to herein simply as a "pulse period") so that a laser pulse train may be characterized by a uniform (at least substantially) PRF. A process segment may start at an arbitrary time, and may not necessarily be synchronized to the existing pulse train generated by the laser system 104 (e.g., based on characteristics of the laser system 104 itself or based on external control by the system controller 114). A process segment is generally associated with a desired laser PRF and beam velocity in order to maintain a desired spacing of beam positions at the workpiece 102 ("bite size"). Laser pulse trains may be generated internally within the laser system 104, or external from the laser system 104. The time duration of a process segment can be designed such that an integer number of laser pulses is emitted, with the first and last laser pulse emitted at a desired workpiece location (within some acceptable tolerance, for example, <5%-25% of the spot diameter). Therefore, in certain embodiments, the first laser pulse (in time) is synchronized relative to the start of a process segment.

In one embodiment, a first laser pulse is synchronized relative to the start of a process segment by modifying a laser pulse command train such that a valid laser pulse is issued at the correct time relative to the start of the process segment. It will be appreciated that many lasers generate laser pulses at a minimum PRF to avoid damaging the laser system 104 due to excessively large pulse energy (which is generally proportional to the inter-pulse period). To avoid an undesirably large pulse period, the start of the laser pulse train for a new process segment (at the desired PRF for that process segment) can be delayed relative to the end of a previously-generated pulse train such that one inter-pulse period is inserted between the two sequentially generated laser pulse trains, wherein the inserted inter-pulse period is smaller than an undesirably large inter-pulse period associated with an excessively large pulse energy. The above-described process of delaying a new process segment can be herein referred to as "laser pulse train resynchronization." Laser pulse train resynchronization can occur during a period when the pulse energy of a laser pulse is blanked as described above (e.g., which may typically occur when the beam position moves from a processed feature to another region on the workpiece where a new feature is to be formed, herein referred to as an "inter-feature move"). During this resynchronization period, the laser pulse energy is attenuated to zero or close to zero. In another embodiment, for example, in which the laser pulse train is externally generated, the time period between process segments may be adjusted to synchronize laser pulse and process segment timing.

E. Coordination of Beam Modulation with Pulse Generation

According to embodiments disclosed herein, AO device RF commands (amplitude and frequency) may be synchronized with the laser pulse train incident to the beam modulation system 112. The command update timing of AO device RF waveforms may be arbitrary relative to laser pulses generated by the laser system 104. In some embodiments, it is desirable for the acoustic wave within the AO crystal (generated by the applied RF command) to contain no transients when the laser pulse passes through the AO crystal. Such transients may distort the amplitude or wavefront of the laser pulse, and deleteriously affect the quality of laser-processing at the workpiece 102. To avoid such transients, the generation of laser pulses by the laser system 104 and modulation of the generated laser pulses within the AO device of the beam modulation system 112 can be synchronized. In one implementation, the AO device RF commands can be held constant for a configurable time period within a temporal envelope surrounding each laser pulse. This allows AO device RF commands to be independently generated, without regard to the details of timing of laser pulse generation. In one embodiment, synchronization of the generating and modulating of laser pulses may occur directly between controllers (not shown) associated with the laser system 104 and the beam modulation system 112.

F. Example Laser Power Control Systems

Figure 6:
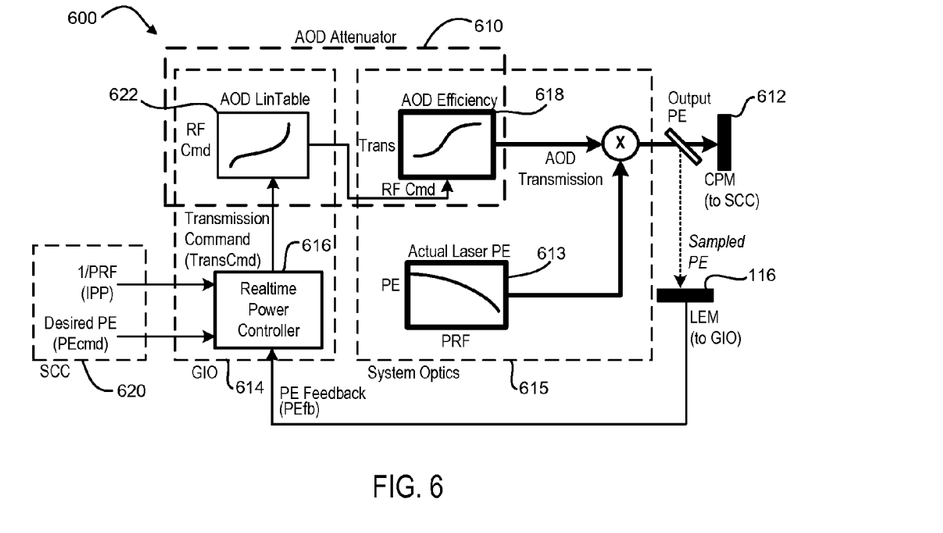
FIG. 6 schematically illustrates some components of a laser power control system according to one embodiment.
Figure 7:
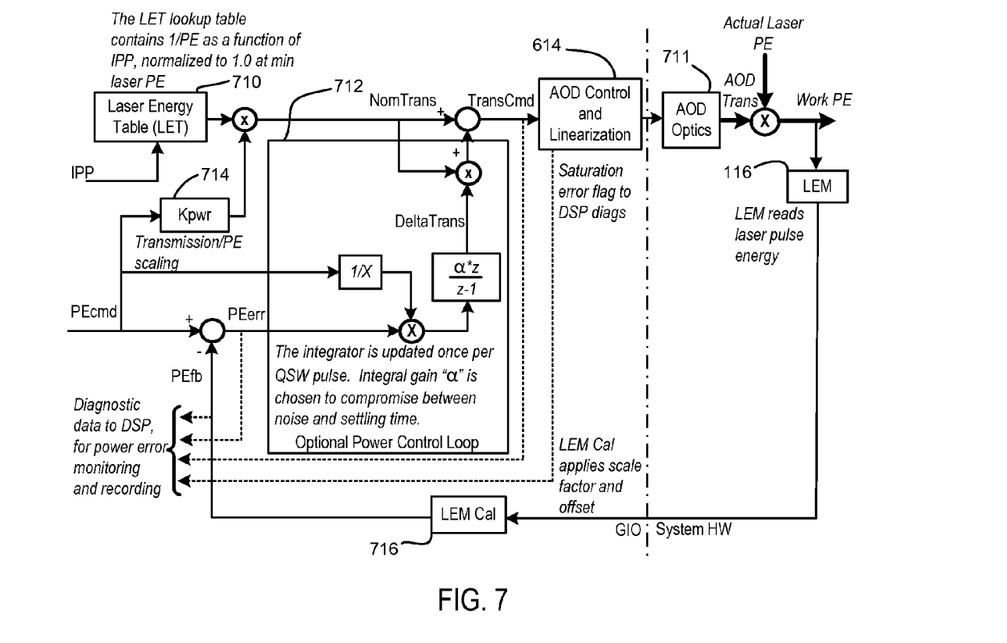
FIG. 7 schematically illustrates a laser power control algorithm according to one embodiment.

Having described example embodiments of associated with measuring the pulse energy of individual laser pulses (e.g., for quality and control purposes), controlling the pulse energy of individual laser pulses to facilitate rapid changes to pulse energy and PRF, coordinating the pulse energy control of individual laser pulses with beam position, and coordinating generation and modulation of the laser pulses, example embodiments of the laser power control system 600, and of its operation, will now be discussed with respect to FIGS. 6 and 7. In the example embodiments discussed with respect to FIGS. 6 and 7, the aforementioned beam modulation system 112 will be provided as an AOD device (e.g., configured to deflect the beam 105 of laser pulses to scan the beam position within the third scan field 204 along one or both of the X-axis and Y-axis), and will hereinafter be referred to simply as an "AOD".

Referring to FIGS. 6 and 7, the example laser power control system 600 shown in FIG. 6 includes an AOD power and control linearization module 614 and system optics 615. The system optics 615 may include, for example the laser system 104 shown in FIG. 1 and AOD optics 711 shown in FIG. 7. A laser pulse energy table, or simply laser energy table (LET) 710, describes available values of pulse energy at the workpiece 102 vs. PRF. The LET 710 can be calibrated before processing the workpiece 102 to model the performance of the laser system 104 and any of the supplemental systems. An AOD attenuator 610 implements calibrated optical power attenuation by varying the transmission of the AOD optics 711. The aforementioned LEM 116 and a chuck power meter (CPM) 612, also included within the laser power control system 600, can provide feedback to calibrate and control the power of individual laser pulses delivered to the workpiece 102 through a general input/output (IO) controller (GIO) (e.g., a realtime general 10 controller). The GIO may be implemented as part of the system controller 114 shown in FIG. 1, or may be separate. In this example, the GIO includes an AOD control and linearization module 614 (shown in FIGS. 6 and 7) and an optional power control loop (PCL) 712 (shown in FIG. 7), among other components. As shown in FIG. 6, the AOD control and linearization module 614 includes a realtime power controller 616 and an AOD linearization table 622.

During laser-processing to form features within the workpiece 102, power control components such as the LET 710, AOD Attenuator 610, LEM 116, CPM 612, and the power controller 616 can coordinate realtime power control and monitoring. The LET 710 is used to calculate a nominal AOD transmission appropriate for a given pulse energy (PE) and PRF setpoint. The LEM 116 and/or CPM 612 verify the power of laser pulses delivered to the workpiece 102 resulting from the applied AOD transmission. When adequately calibrated, the LET 710 and AOD attenuator 610 allow the power controller 616 to implement open loop control of laser pulse energy on a pulse-by-pulse basis, if the laser power of laser pulses generated by the laser system 104 (also referred to herein as "laser head output power") remains (at least substantially) stable between periodic LET calibration and AOD calibration updates. In certain embodiments, the PCL 712 adjusts for short-term laser power fluctuations from the laser system 104 by continuously adjusting the AOD transmission command to maintain the commanded PE despite any variations in the raw laser pulse energy output. The operation and calibration of the aforementioned power control components are described below.

1. Laser Pulse Energy Table (LET)

In the laser processing apparatus 100, the laser head output pulse energy is a function of PRF, and this function varies over time as the laser ages. The LET 710 represents the laser pulse energy available at the workpiece 102 (also referred to herein as the "work PE" or "workpiece PE"), at maximum AOD transmission, for any PRF. The LET 710 is used to calculate the best estimate of the AOD transmission required to provide a requested laser workpiece 102 PE at a desired PRF. The LET 710 describes the actual laser PE 613 (i.e., the laser PE generated by the laser system 104 shown in FIG. 1) available at the workpiece 102 (PElaser). This differs from (and may be higher than) the specified system laser power, which is used to guide setup of the laser-processing. The specified system laser power limits can be described by a separate power limit table; this table is predefined for a given system design (laser and optical train configuration) and is neither calibrated nor updated.

The desired AOD transmission equals PEcmd/PElaser, where PEcmd is the selected or commanded PE and PElaser is the actual laser PE (or true laser PE) at the workpiece. If the LET 710 provides 1/PE laser as a function of PRF, the desired transmission can be calculated by a simple multiply, as shown in FIG. 7. The scaling and implementation of the LET 710 table can be further simplified by separating out a fixed scale factor (Kpwr) 714, such that the LET 710 lookup table contains an attenuation factor (≤1) as a function of pulse period (1/PRF). The product of Kpwr 714 and the LET 710 table value then results in the transmission required to produce the requested PE/PRF combination.

Figure 8:
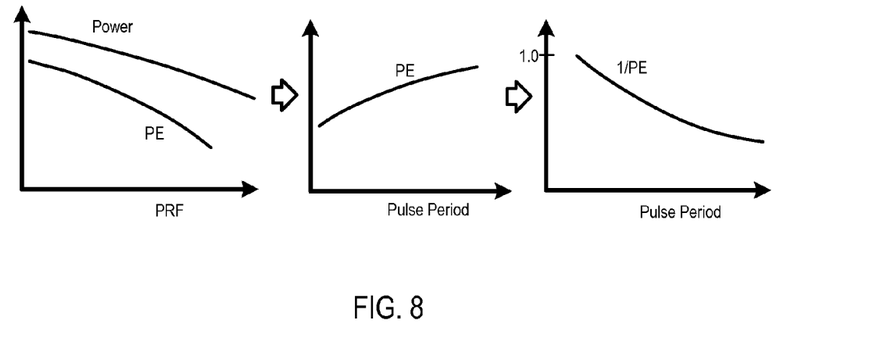
FIG. 8 schematically illustrates the progression from a typical laser power curve to a normalized 1/PE (pulse energy) value as a function of pulse period.

LET entries are generated from laser power data. FIG. 8 illustrates the progression from example laser power curves (e.g., in terms of laser power and PE vs PRF), to PE as a function of pulse period, to a normalized 1/PE value as a function of pulse period. The scaling factor Kpwr 714 is calculated to provide the correct transmission at the PRF containing the lowest laser PE (i.e., the maximum transmission case). At all other pulse periods the laser PE is higher, the LET entries are <1.0, and the transmission can be scaled down appropriately.

In one embodiment, the LET 710 may be used to implement adaptive velocity processing, in which the velocity with which the beam position is scanned relative to the workpiece 102 and the laser PRF can be adjusted (e.g., automatically), to maintain a desired bite size and pulse energy as the laser power of laser pulses generated by the laser system 104 drops over time. Adaptive velocity processing can also allow the higher power of a relatively fresh laser system 104 to be maximally utilized to enhance throughput over the life of the laser.

2. AOD Attenuator

The AOD provides for both beam deflection and power control, through attenuation of the optical transmission of the deflected beam 105. As discussed above, the transmission can be adjusted by varying the RF power level applied the AOD cell. The variation in transmission (i.e., diffraction efficiency or AOD efficiency of the transmission 618) of the AOD is a nonlinear function of the applied RF power and frequency. This nonlinear relationship is calibrated to linearize the actual transmission vs. commanded transmission.

3. LEM and CPM

As discussed above, the LEM 116 can read laser pulse energy (PE) values for each individual laser pulse, and generate PE data therefrom. The PE data is synchronized to a laser Q-switch command of the laser system 104, which runs at a specified PRF, asynchronous to a digital signal processor (DSP) sampling cycle. LEM readings are corrected for offset and scale factor to convert them into PE data. According to certain embodiments, the LEM 116 provides data relating to laser pulse energy—not laser power. If necessary, the LEM PE data can be converted to laser power by multiplying PE by the instantaneous laser PRF. The DSP (and, through a non-realtime command, a system control computer (SCC) 620) can provide access to either a single sampled power reading, or a sequence of power readings (through a data recorder).

The CPM 612 is the reference sensor for power measurements in the system. The LEM readings can be calibrated against the CPM 612 to ensure the accuracy of realtime power setting and monitoring.

G. Power Calibrations

To measure laser energy and control laser power, certain components of the laser processing apparatus may require calibration. In general, however, the calibration and power setting approach can be summarized as follows: (1) the CPM 612 is calibrated against an external reference; (2) the LEM 116 is calibrated using the CPM 612; (3) the LET 710 is calibrated using the LEM 116; (4) the AOD attenuator linearization is calibrated using the LEM 116; (5) for a given PE/PRF setpoint, the nominal AOD transmission (NomTrans) is calculated based on the LET 710; (6) during application processing, LEM feedback is used to monitor for power error conditions, and may optionally be used to fine-tune the AOD transmission command in realtime; and (7) a LEM calibration 716 can be updated periodically to maintain LEM calibration as optics transmission changes. Details of the calibration steps are given below.

1. CPM Calibration

Figure 9:
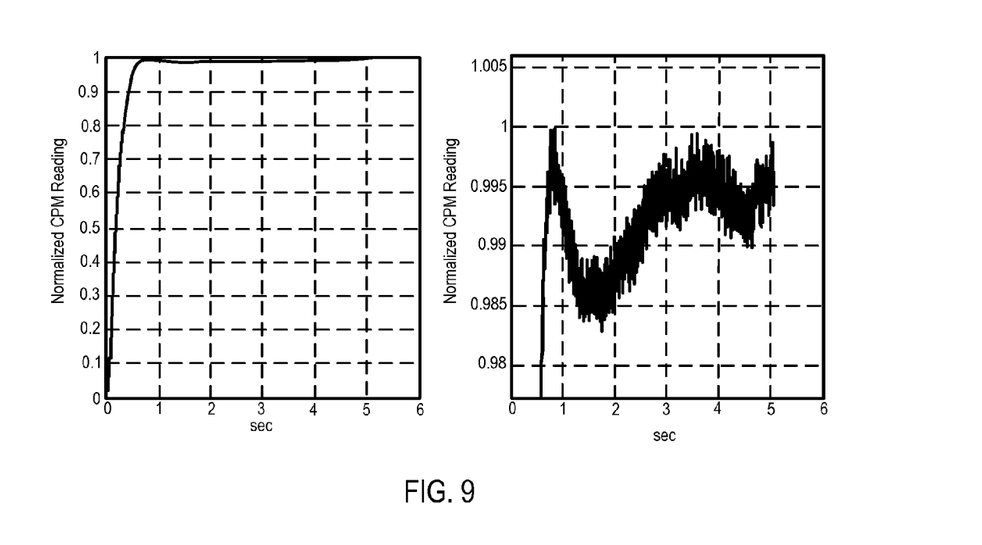
FIG. 9 illustrates a chuck power meter (CPM) reading transient that may be generated in accordance with embodiments of the present disclosure.

During CPM calibration, or during any use of the CPM 612 in subsequent operations, CPM readings (both power and offset) are averaged over a number of readings (e.g., 100 readings), over a period of time (e.g., 2 seconds), after allowing a settling period (e.g., 3 seconds) between power changes. FIG. 9 illustrates a CPM reading transient that may be generated in accordance with embodiments of the present disclosure. CPM readings can be adjusted for CPM offset, which may be sensitive to the power meter temperature. The offset can be measured during each use of the CPM 612. To maximize accuracy, the CPM offset (with zero laser power applied) can be read after the powered reading, reducing the thermal error due to CPM heating. The same averaging process as described above can be used.

2. Laser Energy Monitor (LEM) Calibration

The LEM reading of pulse energy is corrected for offset and scaling, resulting in a LEM PE reading PElem (e.g., in µJ units), according to the following:

PElem=(LemCount—LemOffset)*LemSF, where LemCount is the raw ADC readings from the LEM 116, where LemSF and LemOffset are calculated by measuring a series of power levels with both the LEM 116 and the CPM 612, from zero to max power.

The LEM calibration 716 can be available as both a user-interactive procedure and as an automated procedure (e.g., during runtime of the laser processing apparatus 100). In one embodiment, the user-interactive procedure includes a display of the collected data and the best-fit line, and measurement statistics. The automated procedure may be run automatically, with appropriate error detection and reporting. After each LEM calibration 716, the updated SF and offset values may be recorded in a log for diagnostics and tracking of optics degradation. A LEM verification routine is provided, in certain embodiments, which repeats the LEM calibration 716, but uses existing calibration data to generate a curve-fit line for display and statistics reporting. In one embodiment, the time required to perform LEM calibration 716 is less than 1 second.

3. AOD Linearization Calibration

The AOD linearization calibration creates the linearization table 622 for AOD attenuation. It will be appreciated that the AOD linearization calibration procedure simply linearizes the AOD transmission 618 (i.e., the AOD linearization table 622 is used to linearize the non-linear transmission response of the AOD, as schematically represented by the AOD efficiency transmission 618 versus RF command), and does not depend on (i.e., is insensitive to) the characteristics of the laser system 104 or optics train. Transmission losses, or laser power variations with PRF, are irrelevant if this test is run at a fixed PRF. Although this calibration uses the LEM 116 for feedback, the feedback need only be linear. The calibration algorithm may ignore LEM scaling and offset. Since the linearity error of the LEM 116 is relatively small (e.g., <1%) for a fixed laser PRF, the LEM calibration 716 is not a prerequisite for the AOD linearization calibration.

The AOD linearization calibration can be available as both a user-interactive procedure and as an automated procedure during runtime. In one embodiment, the user-interactive procedure includes a display of relevant data and progress updates. In one embodiment, the automated procedure is run automatically, with appropriate error detection and reporting. Before an automated recalibration is performed, it is beneficial to verify the AOD linearization performance (e.g., using existing linearization data before recalibration), and the max error recorded in the log for diagnostic tracking. In addition, each new linearization table is, in certain embodiments, stored in a time-stamped file to support tracking of AOD performance.

4. Laser Pulse Energy Table (LET) Calibration

The LET 710 is calibrated using LEM readings, after the LEM 116 is calibrated against the CPM 612. This allows the LET calibration to run quickly, just before panel processing, to provide a valid calibration that can support open-loop real-time power control. LET calibration using LEM readings provides a fast calibration (e.g., <1 s), since the LEM 116 has no response lag time. Using the LEM 116 as a reference sensor appropriately accounts for laser degradation effects. Transmission losses between the LEM 116 and workpiece 102 are accounted for within the uncertainty of the LEM calibration 716. Due to variation in optical transmission losses between the LEM 116 and workpiece 102 (or CPM 612), the LEM 116 is periodically recalibrated.

In certain embodiments, the LET calibration is available as a user-interactive procedure, as a fully automated procedure, or a combination thereof. The interactive procedure (typically performed during system calibration) allows the user to review data results and specify calibration parameters for the automated procedure. The automated procedure may be run before each laser-processing the workpiece 102 and need not necessarily require any user interaction, except in case of error.

Figure 11:
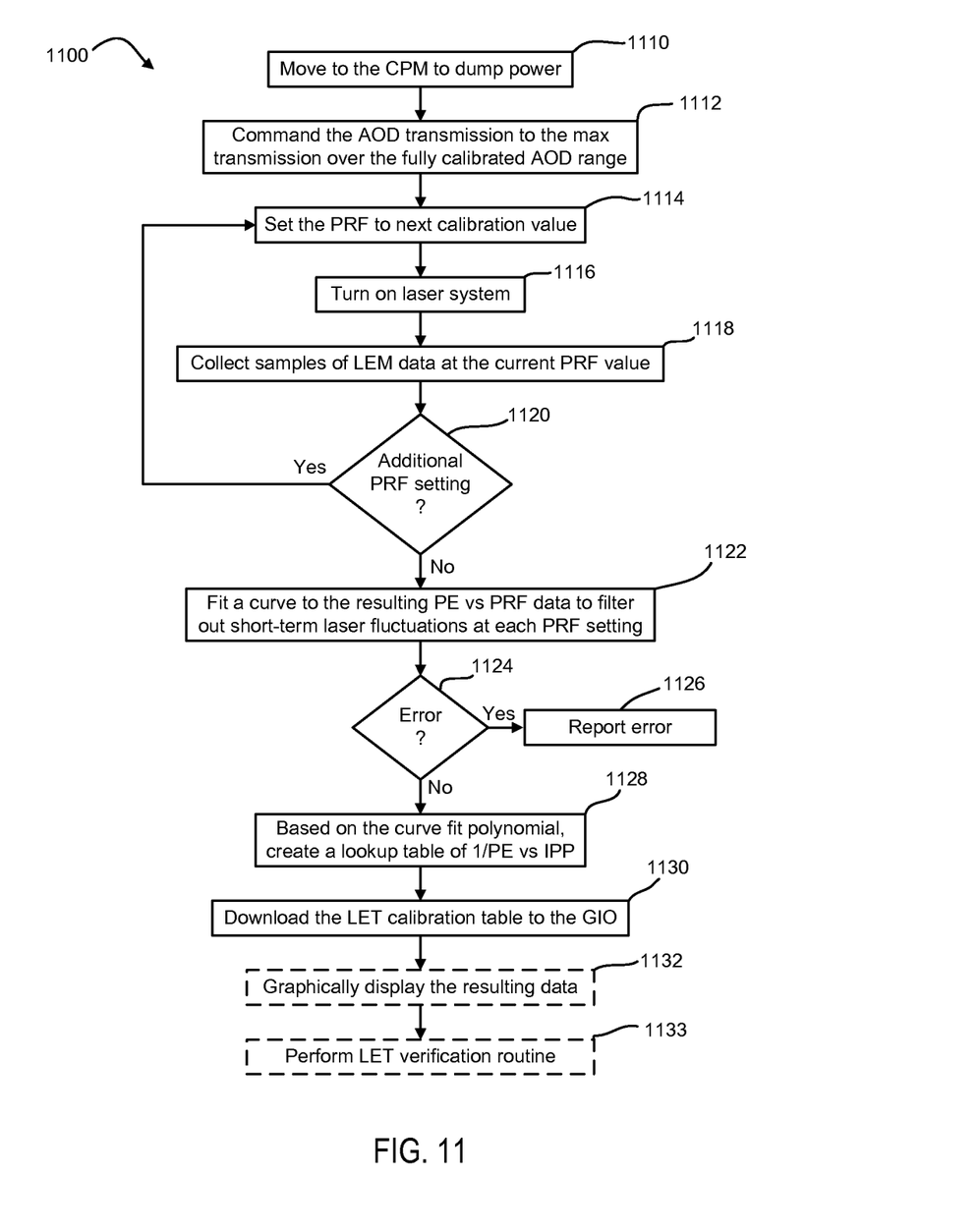
FIG. 11 is a flowchart of an example LET calibration process according to one embodiment.

During LET calibration, the AOD transmission command is held constant at the maximum linearized transmission over the full AOD deflection range. FIG. 11 is a flowchart of an example LET calibration process 1100 according to one embodiment. The LET calibration process 1100 includes moving 1110 to the CPM 612 to dump power. For automated LET calibration, according to certain embodiments, this is done at the end of the previous laser-processing sequence to minimize overhead. The LET calibration process 1100 further includes commanding 1112 the AOD transmission to the maximum transmission over the fully calibrated AOD range. For a predetermined number of PRF settings (e.g., at least 20 PRF settings) covering the laser's operational PRF range, the LET calibration process 1100 repeats: setting 1114 the PRF to the next calibration value; turning on 1116 the laser system 104; and collecting 1118 a selected number of samples (e.g., at least 1000 samples) of LEM data at the current PRF value. Collecting 1118 the samples of LEM data may further include applying LEM calibration 716 to convert the data to µJ, and storing the average (for calibration data) and standard deviation (for diagnostics). The LET calibration process 1100 further includes querying 1120 whether there are additional PRF settings in the predetermined number of PRF settings covering the laser's operational PRF range. If there are additional PRF settings, the LET calibration process 1100 returns to setting 1114 the PRF to the next calibration value, turning on 1116 the laser system, and collecting 1118 samples of LEM data at the current (next) PRF value.

Once LEM data is collected for each PRF setting, the LET calibration process 1100 further includes fitting 1122 a curve to the resulting PE vs PRF data to filter out short-term laser fluctuations at each PRF setting, and querying 1124 whether an error is detected in the LEM measurements. The LET calibration process 1100 includes reporting 1126 an error if the standard deviation of the LEM measurement at any PRF setting exceeds a first predetermined threshold (e.g., 5%), or if the difference between the curve fit and averaged PE reading at any PRF setting exceeds a second predetermined threshold (e.g., 1%). The LET calibration process 1100 includes creating 1128, based on the curve fit polynomial, a lookup table of 1/PE vs IPP, normalized (e.g., to a maximum of 1.0, as shown in FIG. 8). The IPP is specified by integer multiples of, for example, 40 ns. In certain embodiments, the lookup table includes all valid entries for IPP over the laser's operational range. For example, one laser system may operate within a PRF range from 40 kHz to 90 kHz, resulting in a IPP of 25 µs to 11.1 µs, or a 40 ns IPP count of 278 to 625 (348 entries). The LET calibration process 1100 also includes downloading 1130 the LET calibration table to the GIO.

In certain embodiments that include the interactive calibration procedure discussed above, the LET calibration process 1100 further includes graphically displaying 1132 the resulting data. In such embodiments, data plots are presented for review, which may including the following examples: data points for the min, max, and average LEM reading at each tested PRF data point, overlaid with the resulting polynomial fit curve; standard deviation (as a % of mean) of the LEM reading for each PRF data point; and/or difference between curve fit and average reading (e.g., as a % of mean) for each PRF data point.

In addition, or in other embodiments, the LET calibration process 1100 includes performing 1133 a LET verification routine to verify performance. An example LET verification routine includes: a single-point test, in which the user specifies a workpiece 102 power and PRF, and reads the resulting power at the CPM 612; and/or an automated verification procedure, similar to the AOD linearization verification, which sweeps through all pulse periods at a specified pulse energy setting. Feedback is taken from the LEM 116. Error is reported graphically as a function of PRF.

H. Realtime Power Control

In one embodiment, because the GIO has access to Q-switch (QSW) timing, LEM readings, IPP commands, and PE commands, the GIO implements realtime power control. As described above, power control commands can be synchronized with commands to QSW timing of laser pulse generation within the laser system 104. In certain embodiments, valid LEM readings are available only after a QSW command causes the laser system 104 to generate a laser pulse. Due to queuing of laser commands between the DSP and the GIO, the DSP has limited knowledge of the timing of LEM feedback data relative to the laser commands. Encapsulating the power control function within the GIO simplifies data handling and error reporting.

In one embodiment, realtime power control is open loop, based on a freshly calibrated LET 710 downloaded to the GIO just before panel processing. PE feedback (PEfb) from the LEM sensor is corrected for scale factor and offset. The PEfb is subtracted from the corresponding PE command (PEcmd) to provide PE error for error checking. Note that PEcmd can change in realtime, and thus the GIO subtracts PEfb from the corresponding PEcmd signal.

The GIO power controller 616 streams PEfb, PE error (PEerr), and transmission command (TransCmd) to the DSP for error checking and diagnostic recording, as will described in greater detail below. Note that PEcmd=PEfb+PEerr, and can be derived by the DSP if necessary, or added to the GIO data stream if more convenient. The GIO power controller 616 receives PEcmd and IPP in the data stream from the DSP.

1. Power Control Loop

The optional power control loop (PCL) 712 may be included to monitor the PE error in realtime and to adjust the AOD transmission command (e.g., to minimize PE error). The overview of FIG. 6 places the PCL 712 within the context of the system power control subsystem, while FIG. 7 details the signal flow in the PCL 712. The PCL 712 is optional since open loop control can be accurate over reasonable time periods (e.g., several minutes). If open loop performance is found to be inadequate, the PCL 712 can be implemented.

The PCL 712 may be configured to adjust the commanded AOD transmission during processing to maintain the desired PE setpoint. To avoid noise sensitivity and excessive dithering of the transmission command, the error is integrated after applying a correction gain alpha ($\alpha$) that is selected to be a compromise between response time and noise sensitivity (i.e., between noise and settling time). The integrator output (DeltaTrans) modifies the nominal transmission (NomTrans, calculated from the LET 710 for the commanded IPP and PE) to create the final AOD transmission command, according to the following equations. Note that in certain embodiments these equations are evaluated once per QSW cycle (i.e., with each update of PEfb).

$$\text{DeltaTrans}(k)=\text{DeltaTrans}(k-1)-\text{alpha}*(\text{PEfb}-\text{PEcmd})/\text{PEcmd} \quad \text{TransCmd}(k)=\text{NomTrans}*[1+\text{DeltaTrans}(k)]$$

DeltaTrans is the relative change in the transmission command. DeltaTrans can be set to zero upon a recalibration of the LET 710, when the open loop transmission estimate NomTrans is most accurate (nominally exact). In certain embodiments, this occurs each time a workpiece is laser-processed. Note that this algorithm includes a division by PEcmd, which may be difficult in the GIO firmware. A second lookup table may be used to translate PEcmd to 1/PEcmd to replace the division by a multiply.

I. Example Runtime Operation

Figure 12:
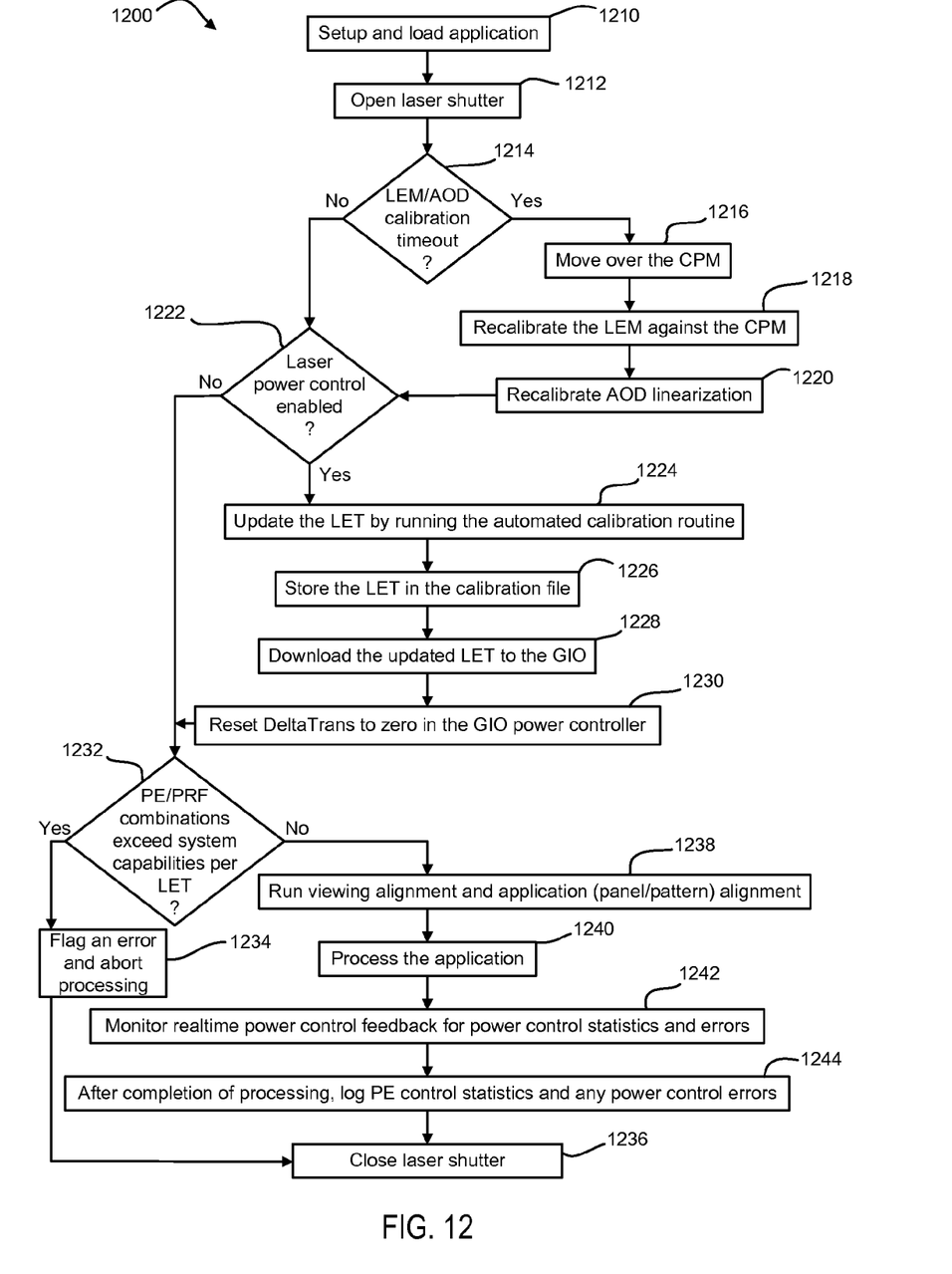
FIG. 12 is a flowchart of an example operation sequence that may be implemented according to one embodiment for power control during laser-processing of the workpiece shown in FIG. 1.

FIG. 12 is a flowchart of an example operation sequence 1200 that may be implemented according to one embodiment for power control during laser-processing of the workpiece 102 shown in FIG. 1. The operation sequence 1200 includes setting up and loading 1210 an application. During application setup, the operation sequence 1200 verifies power settings against the power limit table, which are hardcoded per the system inventory. The operation sequence 1200 also warns the user of tolerance or power level violations, if detected. The operation sequence 1200 further includes opening 1212 the laser shutter and querying 1214 whether the LEM/AOD calibration timeout period has expired. If the LEM/AOD calibration timeout period has expired, the operation sequence 1200 includes moving 1216 over the CPM 612, recalibrating 1218 the LEM 116 against the CPM 612 (e.g., using an automated process), and recalibrating 1220 AOD linearization (e.g., using an automated process).

The operation sequence 1200 further includes querying 1222 whether laser power control is enabled in an application recipe setting. If the laser power control is enabled, the operation sequence 1200 includes updating 1224 the LET 710 by running the automated calibration routine, storing 1226 the LET 710 in the calibration file, downloading 1228 the updated LET 710 to the GIO, and resetting 1230 DeltaTrans to zero in the GIO power controller 616.

The operation sequence 1200 further includes querying 1232 whether any PE/PRF combinations exceed the system capability as described by the LET 710. If a PE/PRF combination exceeds the system capabilities, the operation sequence 1200 includes flagging 1234 an error and aborting the processing. Accordingly, the operation sequence 1200 proceeds to closing 1236 the laser shutter. If, however, no PE/PRF combinations exceed the system capability as described by the LET 710, the operation sequence 1200 includes running 1238 viewing alignment and application (panel/pattern) alignment, processing 1240 the application, and monitoring 1242 realtime power control feedback for power control statistics and errors. After completion of processing, the operation sequence 1200 may further include logging 1244 PE control statistics (e.g., min, max, average, and RMS error as a percent of commanded PE) and/or logging any power control errors, and reporting any error condition to the user. The operation sequence 1200 ends by closing 1236 the laser shutter. In certain embodiments, the AOD acts as the laser shutter. In such embodiments, closing 1236 the laser shutter includes sending a transmission command to the AOD for zero transmission.

Certain details of the example operation sequence 1200 shown in FIG. 12 are further discussed below.

1. Application Setup

In certain embodiments, applications are set up according to the specified system power, described by the power limit table. This table can be precalculated based on specified laser performance (PE vs PRF) and the optics train configuration (efficiency), based on corresponding inventory selections. In one embodiment, the estimated optical efficiency is increased according to the AOD operational deflection range.

2. PE Tolerance Checking and Error Recording

Proper control of PE during laser processing facilitates desirable process control. In certain embodiments, the PE error is monitored in realtime, and PEfb and PEerr are recorded for process control and diagnostic data. The monitoring can determine whether the PE readings are within some predefined or user-defined processing tolerance. To avoid spurious errors due to the inherent laser pulse instability, the PE error is filtered before the tolerance check. As with the integration filter in the PCL 712, since the PE data arrives at variable time intervals, the error filter updates with every PE sample, rather than at a constant sample rate. A realtime command to set the power tolerance threshold is passed to the DSP to set up power tolerance checking.

In one embodiment, power control data (e.g., TransCmd, PEcmd, PEfb and PEerr) is recorded for failure diagnostics. This data may be stored in a circular buffer, and may be retrieved when a tolerance error occurs. Upon detection of a PE tolerance error, the recording is triggered to capture a certain number of samples of PE data (e.g., at least 100 samples) surrounding the error event.

In one embodiment, laser-processing of the workpiece 102 is halted if a power tolerance error is detected. In one embodiment, the user can resume panel processing in the vicinity of the feature at which the processing error occurred. Some processing redundancy or gaps may be acceptable (since the region where the workpiece 102 was being laser-processed would likely be scrapped in the vicinity of the error). In one embodiment, the context of the processing error is presented to the user (e.g., a graphic of the workpiece, with the failure location highlighted, may be presented to the user via a display).

3. Power Tolerance Policies

At the SCC level, tolerance checking may be optional when running an application. If the tolerance checking is disabled, realtime power control can still be applied as described above, but the LET 710 may not be recalibrated, and run-time tolerance checking can be disabled.

Figure 10:
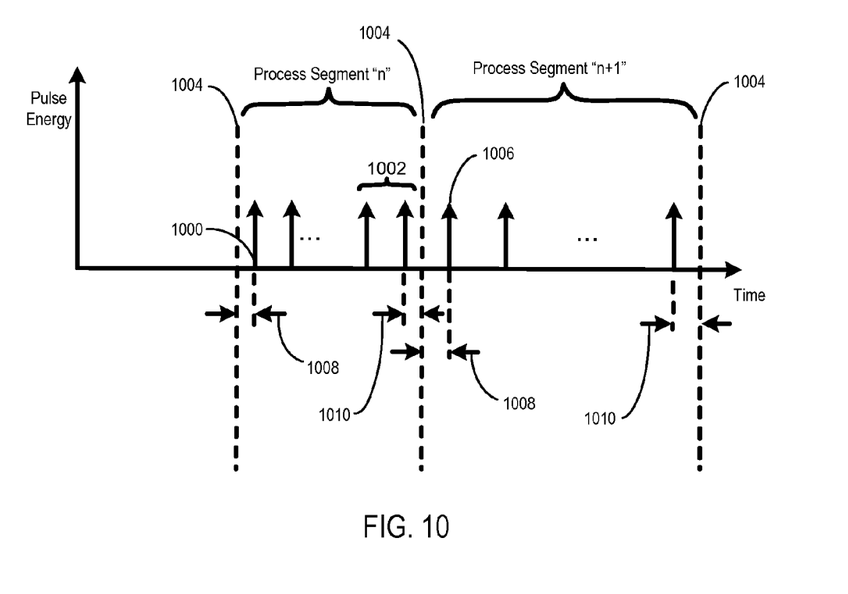
FIG. 10 schematically illustrates pulse synchronization across sequential process segments associated with different pulse periods or pulse repetition frequencies.

In one embodiment, and with reference to FIG. 10, the pulse period (PP) (i.e., 1/PRF) may change between process segments (e.g., between process segment "n" and a subsequent process segment "n+1") without a synchronization deadzone to allow "seamless" changes in the pulse period or PRF. During the transition from one pulse period to another, only the two pulse periods exist, i.e., there is no intermediate or unusually high or low pulse period between the two. This allows the laser system 104 to generate laser pulses 1000 at a predictable pulse energy at any pulse period. Generally, the aforementioned AOD transmission changes between the two pulse period settings to control PE of the laser pulses 1000 delivered to the workpiece 102 in each process segment.

To make the transition between pulse periods (e.g., switching between PPn and PPn+1) at least substantially "seamless", the GIO specifies a new pulse period during the final PPn (e.g., as designated at 1002). The GIO recognizes this new pulse period (e.g., PPn+1) and sets up the subsequent laser pulse according to this new value. The DSP times this command such that the switch between PPn and PPn+1 occurs at the correct time (e.g., within 1 μs).

In one embodiment, the timing of laser pulses relative to segment boundaries 1004 is accounted for. In one embodiment, the velocity of the beam position may change between process segments, resulting in a change in bite size for one transition pulse 1006 associated with the new pulse period PPn+1. In another embodiment, the AOD transmission for the laser pulses generated during the new process segment n+1 is established, since the new pulse period PPn+1 will likely change the PE of laser pulses generated by the laser system for the new process segment n+1. Thus, the transition pulse 1006 is generated by the laser system 104 within the appropriate process segment at the appropriate PE command (AOD transmission).

According to the pulse synchronization process of the embodiment shown in FIG. 10, the first laser pulse generated during a particular process segment is generated within an initialization period 1008 (e.g., equal to one-half of the pulse period associated with the particular process segment) after the beginning of the process segment (e.g., if PPn is 1 μs, then the initialization period could be 0.5 μs).

In another embodiment, the last laser pulse generated during a particular process segment is generated within a finalization period 1010 (e.g., equal to one-half of the pulse period associated with the particular process segment) after the beginning of the process segment (e.g., if PPn is 1 μs, then the finalization period could be 0.5 μs).

It will be understood by those having skill in the art that many changes may be made to the details of the above-described embodiments without departing from the underlying principles of the invention. The scope of the present invention should, therefore, be determined only by the following claims.

What is claimed is:

1. An apparatus comprising:
a controller for use with a beam modulation system, the beam modulation system operative to attenuate laser pulse energy in response to a transmission command input thereto, the controller configured to:
receive timing data representing a PRF at which laser pulses are to be directed into the beam modulation system;
receive first pulse energy data corresponding to a desired laser pulse energy which to be transmitted by the beam modulation system;
generate and output the transmission command based, at least in part, on the received timing data and the first pulse energy data.

2. The apparatus of claim 1, further comprising the beam modulation system.

3. The apparatus of claim 2, further comprising:
a laser energy monitor (LEM) operative to measure a laser pulse energy of each laser pulse transmitted by the beam modulation system and generate second pulse energy data corresponding thereto.

4. The apparatus of claim 3, further comprising:
a chuck power meter (CPM) operative to provide a reference sensor for power measurements in the apparatus, wherein the second pulse energy data is calibrated against measurements provided by the CPM.

5. The apparatus of claim 3, wherein the controller is further configured to:
receive the second pulse energy data; and
generate the transmission command based, at least in part, on the received timing data, the first pulse energy data and the second pulse energy data.

6. The apparatus of claim 2, further comprising a laser system operative to generate the laser pulses, wherein the beam modulation system is arranged to receive the laser pulses.

7. The apparatus of claim 6, wherein the laser system is operative to generate the laser pulses at at least two PRFs.

8. The apparatus of claim 7, wherein the controller is further configured to generate the transmission command by reference to a laser pulse energy table (LET) representing a degree to which the beam modulation system can attenuate laser pulse energy as a function of PRF, for the at least two PRFs.

9. The apparatus of claim 6, further comprising a positioning system, the positioning system the beam modulation system.

10. The apparatus of claim 2, wherein the attenuator includes an acousto-optic deflector (AOD).

11. A laser processing apparatus, comprising:
a laser system to generate a beam of laser pulses;
a pulse energy control system to adjust a pulse energy of each laser pulse in the beam of laser pulses on a pulse-by-pulse basis, the pulse energy control system comprising an open loop feedforward control path that selects a pulse energy transmission value for each laser pulse based on a calibrated transmission curve that maps laser pulse energy as a function of pulse repetition frequency (PRF); and
a positioning system to coordinate one or more locations of the beam of laser pulses relative to the workpiece,
wherein the pulse energy control system comprises an attenuator to implement calibrated optical power attenuation of the pulse energy of each laser pulse in the beam of laser pulses by varying transmissions of the attenuator based on a laser pulse energy table (LET) comprising available values of laser pulse energy at the workpiece versus PRF, for a selected pulse energy at a current PRF, and
wherein the attenuator comprises a transmission linearization table that maps nonlinear transmission characteristics of the attenuator versus applied radio frequency (RF) power and/or frequency.

12. An apparatus for processing a workpiece using laser energy, the apparatus comprising:
a laser system operative to generate the laser energy, the laser energy being directable along a path to impinge upon the workpiece;
a beam modulation system disposed the path between the laser system and the workpiece, the beam modulation system being operative to diffract the laser energy;
a positioning system operative to change a relative position between the path and the workpiece, the positioning system including at least one selected from the group consisting of the beam modulation system operative to diffract the laser energy, a beam positioning system operative to reflect the laser energy, and a workpiece positioning system configured to move the workpiece; and
a controller configured to control an operation of the beam modulation system to attenuate pulse energy directed along the path based on the relative position between the path and the workpiece.

13. The apparatus of claim 12, wherein the positioning system comprises the beam modulation system.

14. The apparatus of claim 13, wherein the positioning system comprises the workpiece positioning system.

15. A method of controlling laser pulse power within a beam of laser pulses generated by a laser processing apparatus configured to laser-process a workpiece by causing laser pulses within the beam of laser pulses to impinge upon the workpiece, the method comprising:
selecting a pulse energy transmission value for each laser pulse within the beam of laser pulses based on a calibrated transmission curve that maps pulse energy to changes in pulse repetition frequency (PRF);
adjusting, based on the selected pulse energy transmission value, a pulse energy of each laser pulse in the beam of laser pulses on a pulse-by-pulse basis; and
coordinating movement of the beam of laser pulses relative to the workpiece.

16. The method of claim 15, further comprising:
measuring a laser pulse energy of each laser pulse in the beam of laser pulses; and
further adjusting the pulse energy of one or more laser pulses in the beam of laser pulses based on the measured laser pulse energy.

17. The method of claim 16, further comprising:
selecting the pulse energy transmission value for each laser pulse using a first transmission command signal based on the calibrated transmission curve;
receiving a pulse energy error signal comprising a difference between a selected laser pulse energy and the measured laser pulse energy;
calculating a transmission correction signal based on the pulse energy error signal; and modifying the first transmission command signal with the transmission correction signal to produce a second transmission command signal for selecting the pulse energy transmission value for each laser pulse.

18. The method of claim 17, wherein calculating the transmission correction signal comprises integrating the pulse energy error signal after applying a correction gain that is selected based on response time and noise sensitivity.

19. The method of claim 15, further comprising adjusting the pulse energy of one or more laser pulses in the beam of laser pulses in response to a change in PRF.

20. The method of claim 15, further comprising adjusting the pulse energy of one or more laser pulses in the beam of laser pulses based on the coordinating movement of the beam of laser pulses relative to the workpiece such that selected laser pulse energies are provided to corresponding locations on or in the workpiece.

* * * * *